US011183838B2

United States Patent
Fu et al.

(10) Patent No.: US 11,183,838 B2
(45) Date of Patent: Nov. 23, 2021

(54) POWER SOURCING EQUIPMENT AND POWER OVER ETHERNET SYSTEM

(71) Applicant: Huawei Technologies Co., Ltd., Shenzhen (CN)

(72) Inventors: Shiyong Fu, Nanjing (CN); Yan Zhuang, Nanjing (CN); Qi Dong, Nanjing (CN); Xiangen Xu, Nanjing (CN); Xueqi Chen, Nanjing (CN); Yu Ding, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 16/433,718

(22) Filed: Jun. 6, 2019

(65) Prior Publication Data

US 2019/0379203 A1 Dec. 12, 2019

(30) Foreign Application Priority Data

Jun. 8, 2018 (CN) .......................... 201810586371.0

(51) Int. Cl.
*H02H 9/00* (2006.01)
*H02H 9/04* (2006.01)
(Continued)

(52) U.S. Cl.
CPC .............. *H02H 9/045* (2013.01); *H02H 3/22* (2013.01); *H02H 9/00* (2013.01); *H02H 9/04* (2013.01);
(Continued)

(58) Field of Classification Search
CPC .. H02H 9/00; H02H 3/22; H02H 9/04; H02H 9/046; H02H 7/20; H02H 9/044; H02H 9/02; H02H 9/045; H04L 12/10
(Continued)

(56) References Cited

U.S. PATENT DOCUMENTS

2006/0215343 A1* 9/2006 Camagna ................ H04M 3/18
361/111
2007/0263333 A1 11/2007 Apfel
(Continued)

FOREIGN PATENT DOCUMENTS

CN 101227087 A 7/2008
CN 102110980 A 6/2011
(Continued)

OTHER PUBLICATIONS

"Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE Std 802.3af™, IEEE Computer Society, Jun. 18, 2003, 133 pages.
(Continued)

*Primary Examiner* — Danny Nguyen
(74) *Attorney, Agent, or Firm* — Conley Rose, P.C.

(57) ABSTRACT

Power sourcing equipment for power over Ethernet (PoE) includes a power supply control circuit, an Ethernet port, and a surge protection circuit. The surge protection circuit includes a first circuit, a second circuit, and a common discharge circuit. The first circuit is connected to a power supply pin group of the Ethernet port, the power supply control circuit, and the common discharge circuit. The second circuit is connected to a non-power supply pin group of the Ethernet port and the common discharge circuit. The first circuit transmits, to the common discharge circuit, a first surge that is input from the power supply pin group. The second circuit transmits, to the common discharge circuit, a second surge that is input from the non-power supply pin group. The common discharge circuit discharges the first surge and the second surge to ground.

20 Claims, 10 Drawing Sheets

(51) Int. Cl.
 *H04L 12/10* (2006.01)
 *H02H 3/22* (2006.01)
 *H02H 7/20* (2006.01)
(52) U.S. Cl.
 CPC .............. *H04L 12/10* (2013.01); *H02H 7/20* (2013.01); *H02H 9/044* (2013.01); *H02H 9/046* (2013.01)
(58) Field of Classification Search
 USPC ........................... 361/56, 91.1, 111, 117–119
 See application file for complete search history.

(56) References Cited

U.S. PATENT DOCUMENTS

| | | | |
|---|---|---|---|
| 2008/0037188 | A1 | 2/2008 | Wilson et al. |
| 2008/0151457 | A1* | 6/2008 | Apfel ..................... H04L 12/10 361/111 |
| 2009/0161281 | A1 | 6/2009 | Maggiolino |
| 2013/0031383 | A1 | 1/2013 | Tuen et al. |
| 2014/0036400 | A1 | 2/2014 | Zhou et al. |
| 2016/0064924 | A1 | 3/2016 | Wiese et al. |

FOREIGN PATENT DOCUMENTS

| | | |
|---|---|---|
| CN | 102185698 A | 9/2011 |
| CN | 202009229 U | 10/2011 |
| CN | 202474848 U | 10/2012 |
| CN | 102842903 A | 12/2012 |
| CN | 203596614 U | 5/2014 |
| CN | 203800584 U | 8/2014 |
| CN | 204464985 U | 7/2015 |
| CN | 205945038 U | 2/2017 |
| CN | 206135405 U | 4/2017 |
| CN | 206461349 U | 9/2017 |
| CN | 207475193 U | 6/2018 |
| EP | 1883179 A1 | 1/2008 |
| EP | 2672656 A1 | 12/2013 |

OTHER PUBLICATIONS

"Part 3: Carrier Sense Multiple Access with Collision Detection (CSMA/CD) Access Method and Physical Layer Specifications, Amendment 3: Data Terminal Equipment (DTE) Power via the Media Dependent Interface (MDI) Enhancements," IEEE Std 802.3at™, IEEE Computer Society, Oct. 30, 2009, 141 pages.

"Draft Standard for Ethernet Amendment: Power over Ethernet over 4 Pairs," IEEE P802.3bt™/D2.5, Jun. 16, 2017, 270 pages.

Foreign Communication From a Counterpad Application, European Application No. 19178704.3, Extended European Search Report dated Sep. 5, 2019, 7 pages.

\* cited by examiner

When a positive surge is generated on a first Ethernet port, a surge protection circuit corresponding to the first Ethernet port discharges the positive surge to ground — 901

When a negative surge is generated on the first Ethernet port, the surge protection circuit corresponding to the first Ethernet port discharges the negative surge to ground — 902

POWER SOURCING EQUIPMENT AND POWER OVER ETHERNET SYSTEM

CROSS-REFERENCE TO RELATED APPLICATION

This application claims priority to Chinese Patent Application No. 201810586371.0, filed on Jun. 8, 2018, which is hereby incorporated by reference in its entirety.

TECHNICAL FIELD

The present disclosure relates to the communications field, and in particular, to power sourcing equipment and a power over Ethernet system.

BACKGROUND

A power over Ethernet (PoE) system includes power sourcing equipment (PSE) and a powered device (PD). The PSE may communicate with the PD by using an Ethernet cable and supply electrical power to the PD. The Ethernet cable is also referred to as Ethernet twisted pairs, including eight wires numbered 1 to 8. A wire 1 and a wire 2 are a pair that is referred to as a 1-2 twisted pair. A wire 3 and a wire 6 are a pair that is referred to as a 3-6 twisted pair. A wire 4 and a wire 5 are a pair that is referred to as a 4-5 twisted pair. A wire 7 and a wire 8 are a pair that is referred to as a 7-8 twisted pair. Two wires of a pair are twisted together.

With development of a cloud technology in recent several years, there are increasingly more types of devices that need to support remote power supplying. Currently, in addition to a conventional Internet Protocol (IP) phone, a conventional IP camera, and the like, there are devices such as a cloud terminal, a digital high-definition camera, and a light-emitting diode (LED) lamp. In most cases, these devices need to be deployed outdoors. This poses a higher requirement for lightning protection of a PoE port of the power sourcing equipment.

SUMMARY

This application provides PSE and a PoE system. A surge protection circuit in the PSE leads, to a common discharge circuit for discharge, a surge that is input from a power supply pin group of an Ethernet port and a surge that is input from a non-power supply pin group, and there is no need to separately deploy two discharge circuits for one Ethernet port. This not only can reduce device costs, but also can reduce a volume of the surge protection circuit, so as to reduce a volume of the PSE device.

According to a first aspect, PSE is provided, including a first power supply control circuit, a first Ethernet port, and a surge protection circuit, where the first Ethernet port includes a first power supply pin group and a first non-power supply pin group; the surge protection circuit includes a first circuit, a second circuit, and a first common discharge circuit; the first circuit is connected to the first power supply pin group, the first power supply control circuit, and the first common discharge circuit; the second circuit is connected to the first non-power supply pin group and the first common discharge circuit; the first circuit is configured to transmit a first surge to the first common discharge circuit, where the first surge is a surge that is input from the first power supply pin group to the PSE; the second circuit is configured to transmit a second surge to the first common discharge circuit, where the second surge is a surge that is input from the first non-power supply pin group to the PSE; and the first common discharge circuit is configured to discharge the first surge and the second surge.

The surge protection circuit of the PSE transmits a surge to the first common discharge circuit through the first circuit designed for the first power supply pin group and the second circuit designed for the first non-power supply pin group, and the first common discharge circuit discharges, to ground, all surges that are input from the first Ethernet port to the PSE. In this way, there is no need to independently deploy a discharge circuit for the first non-power supply pin group. This not only can reduce device costs, but also can reduce a size of the surge protection circuit, so as to reduce a device volume. In addition, the surge protection circuit prevents a surge from damaging the first power supply, so as to protect the PSE.

With reference to the first aspect, in a first possible implementation of the first aspect, the PSE further includes a first power supply; the first power supply control circuit and the first Ethernet port are connected to the first power supply; the first circuit, the second circuit, and the first common discharge circuit are also connected to the first power supply of the PSE; the first power supply pin group includes a first power supply pin pair and a second power supply pin pair; the first circuit includes a first connection end, a second connection end, and a third connection end; the second circuit includes a fourth connection end, a fifth connection end, and a sixth connection end; the first common discharge circuit includes a first common connection end and a second common connection end; the first connection end and the first common connection end are connected to a first electrode of the first power supply of the PSE, and connected to the first power supply pin pair; the second connection end and the second common connection end are connected to a second electrode of the first power supply of the PSE, and connected to a first control end of the first power supply control circuit; the third connection end is connected to the second power supply pin pair, and connected to a second control end of the first power supply control circuit; and the fourth connection end is connected to the first electrode of the first power supply, the fifth connection end is connected to the second electrode of the first power supply, and the sixth connection end is connected to the first non-power supply pin group.

With reference to the first possible implementation of the first aspect, in a second possible implementation of the first aspect, the first circuit includes a first protective component and a second protective component; a first end of the first protective component is connected to the first connection end, both a second end of the first protective component and a first end of the second protective component are connected to the third connection end, and a second end of the second protective component is connected to the second connection end; the first surge includes a first sub-surge and a second sub-surge, the first sub-surge is input from the first power supply pin pair, and the second sub-surge is input from the second power supply pin pair; the first protective component is configured to: when the first surge is a positive surge, prevent the first sub-surge from flowing into the first power supply control circuit, so that the first sub-surge is transmitted to the first common connection end; and transmit the second sub-surge to the first common connection end; the second protective component is configured to: when the first surge is the positive surge, prevent the second sub-surge from flowing into the first power supply control circuit, so that the second sub-surge is transmitted to the first common connection end through the first protective component; or the first protective component is further configured to: when the first surge is a negative surge, prevent the first sub-surge from flowing into the first power supply control circuit, so that the first negative surge is transmitted to the first common connection end; the second protective component is further configured to: when the first surge is the negative surge, transmit the second sub-surge to the second common connection end; and a voltage of the positive surge is positive and is far higher than a voltage of the power supply of the PSE (the first power supply), and a voltage of the negative surge is negative and is far lower than the voltage of the power supply of the PSE.

With reference to the first or the second possible implementation of the first aspect, in a third possible implementation of the first aspect, the second circuit includes a third protective component and a fourth protective component; and a first end of the third protective component is connected to the fourth connection end, a second end of the fourth protective component is connected to the fifth connection end, and both a second end of the third protective component and a first end of the fourth protective component are connected to the sixth connection end; the third protective component is configured to: when the second surge is a positive surge, transmit the second surge to the first common connection end; and the fourth protective component is configured to: when the second surge is a negative surge, transmit the second surge to the second common connection end.

With reference to the third possible implementation of the first aspect, in a fourth possible implementation of the first aspect, the third protective component is a diode or a transient voltage suppressor (TVS), and the fourth protective component is a diode or a TVS. The second surge that is input from the first non-power supply pin group to the PSE can be led to the first common discharge circuit by using the diode or the TVS whose costs are low and whose volume is small, and discharged. There is no need to independently deploy a discharge circuit, and costs and a volume of the PSE can be reduced.

With reference to any one of the first to the fourth possible implementations of the first aspect, in a fifth possible implementation of the first aspect, the first common discharge circuit includes a first common protective component and a second common protective component; a first end of the first common protective component is connected to the first common connection end, both a second end of the first common protective component and a first end of the second common protective component are grounded, and a second end of the second common protective component is connected to the second common connection end; the first common protective component is configured to discharge a surge received from the first common connection end to ground; and the second common protective component is configured to discharge a surge received from the second common connection end to ground.

With reference to the fifth possible implementation of the first aspect, in a sixth possible implementation of the first aspect, the first common protective component is a varistor or a gas discharge tube, and the second common protective component is a varistor or a gas discharge tube.

With reference to the fifth or the sixth possible implementation of the first aspect, in a seventh possible implementation of the first aspect, the first common discharge circuit further includes a third common protective component; a first end of the third common protective component is connected to the first common connection end, and a second end of the third common protective component is connected to the second common connection end; the third common protective component is configured to ensure that a voltage between a positive electrode and a negative electrode of the first power supply is within a preset voltage range. This can prevent the surge from causing an excessively large voltage difference between the two electrodes of the first power supply and damaging the first power supply. The preset voltage range may be set based on a power supply voltage specified according to a PoE protocol.

With reference to any one of the first aspect or the first to the seventh possible implementations of the first aspect, in an eighth possible implementation of the first aspect, the PSE further includes a second Ethernet port and a second power supply control circuit; the second Ethernet port includes a second power supply pin group and a second non-power supply pin group; the surge protection circuit further includes a third circuit and a fourth circuit; the third circuit is connected to the second power supply pin group, the second power supply control circuit, and the first common discharge circuit; the fourth circuit is connected to the second non-power supply pin group and the first common discharge circuit; the third circuit is configured to transmit a third surge to the first common discharge circuit, to prevent the third surge from impacting on the second power supply control circuit, where the third surge is a surge that is input from the second power supply pin group to the PSE; the fourth circuit is configured to transmit a fourth surge to the first common discharge circuit, where the fourth surge is a surge that is input from the second non-power supply pin group to the PSE; and the first common discharge circuit is further configured to discharge the third surge and the fourth surge.

When the PSE provided in this application includes a plurality of Ethernet ports, the foregoing surge protection circuit is used. In this way, there is no need to dedicatedly configure a discharge circuit (a varistor or a gas discharge tube) for a non-power supply pin group of each Ethernet port. This can reduce device costs and a device volume more significantly.

With reference to any one of the first aspect or the first to the eighth possible implementations of the first aspect, in a ninth possible implementation of the first aspect, the PSE further includes a third Ethernet port, a third power supply control circuit, and a second power supply; the surge protection circuit further includes a fifth circuit, a sixth circuit, and a second common discharge circuit; the second common discharge circuit is connected to the second power supply; the third Ethernet port includes a third power supply pin group and a third non-power supply pin group; the fifth circuit is connected to the third power supply pin group, the third power supply control circuit, and the second common discharge circuit; the sixth circuit is connected to the third non-power supply pin group and the second common discharge circuit; the fifth circuit is configured to transmit a fifth surge to the second common discharge circuit, to prevent the fifth surge from impacting on the third power supply control circuit, where the fifth surge is a surge that is input from the third power supply pin group to the PSE; the sixth circuit is configured to transmit a sixth surge to the second common discharge circuit, where the sixth surge is a surge that is input from the third non-power supply pin group to the PSE; and the second common discharge circuit is configured to discharge the fifth surge and the sixth surge.

When the PSE uses a plurality of power supplies to respectively provide power over Ethernet for different Ethernet ports, the PSE uses the foregoing surge protection circuit. This not only can prevent each power supply from being impacted by a surge, and therefore prevent the PSE from being damaged, but also can reduce device costs and a device volume more significantly.

According to a second aspect, a PoE system is provided, including the PSE according to any one of the first aspect or the possible implementations of the first aspect and a PD. The PD is connected to the PSE by using an Ethernet cable.

According to a third aspect, a surge protection method is provided and used in the PSE according to any one of the first aspect or the possible implementations of the first aspect. The surge protection method includes: when a positive surge is generated on a first Ethernet port, discharging, by a surge protection circuit corresponding to the first Ethernet port, the positive surge to ground; and when a negative surge is generated on the first Ethernet port, discharging, by the surge protection circuit corresponding to the first Ethernet port, the negative surge to ground.

Optionally, the PSE includes at least one Ethernet port, and the first Ethernet port is any one of the at least one Ethernet port.

DESCRIPTION OF EMBODIMENTS

Figure 1:
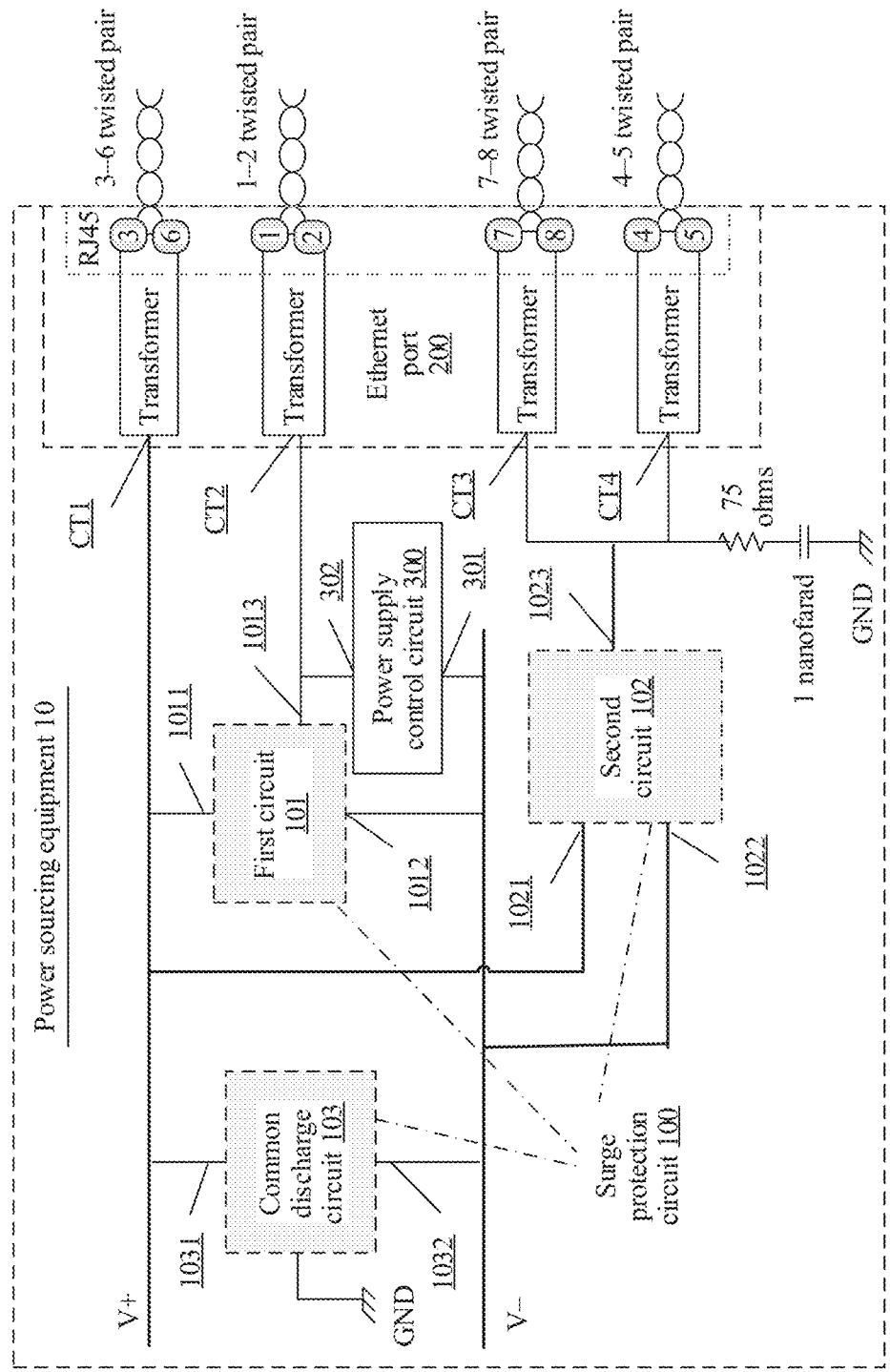
FIG. 1 is a schematic structural diagram of PSE according to an embodiment of the present disclosure.

The following describes in detail, with reference to the accompanying drawings, power sourcing equipment and a power supply system that are provided in the embodiments of the present disclosure.

Generally, the power sourcing equipment uses a varistor (voltage-dependent resistor (VDR)) or uses a gas discharge tube (gas-filled tube, gas tube, or discharge tube) to prevent a surge, for example, a lightning surge. The surge is a high voltage pulse, for example, a voltage pulse with a voltage higher than 2000 volts (V), generated in an instant (for example, in a lightning strike instant). A tremendous amount of energy is generated by the surge. If protection is not provided in advance, the device is impacted, and therefore the device is damaged. For power sourcing equipment with a plurality of PoE ports, surge protection needs to be provided for each PoE port. The varistor has a large volume.

If each PoE port integrates a varistor, though costs are low, a device volume is quite large, and the device is quite bulky. Though the gas discharge tube has a small volume, costs are high. If each PoE port integrates a gas discharge tube, device costs are increased significantly. How to provide a surge protection solution in which costs of the power sourcing equipment with the plurality of PoE ports are low and a size of the power sourcing equipment is small is an urgent problem to be resolved.

An Ethernet port generally includes eight pins that are numbered 1 to 8 and that are used to respectively connect to wires 1 to 8 in an Ethernet cable. A pin 1 and a pin 2 are a pair that is referred to as a 1-2 pin pair. A pin 3 and a pin 6 are a pair that is referred to as a 3-6 pin pair. A pin 4 and a pin 5 are a pair that is referred to as a 4-5 pin pair. A pin 7 and a pin 8 are a pair that is referred to as a 7-8 pin pair. The 1-2 pin pair is used to connect to a 1-2 twisted pair in the Ethernet cable, the 3-6 pin pair is used to connect to a 3-6 twisted pair in the Ethernet cable, the 4-5 pin pair is used to connect to a 4-5 twisted pair in the Ethernet cable, and the 7-8 pin pair is used to connect to a 7-8 twisted pair in the Ethernet cable.

An alternative A (Alternative A) and an alternative B (Alternative B) in both of which two twisted pairs are used for supplying power are defined in PoE standard.

In the alternative A, it is stipulated that the 1-2 twisted pair and the 3-6 twisted pair are used for supplying power. The 1-2 twisted pair may be used to provide a negative voltage, and the 3-6 twisted pair may be used to provide a positive voltage. Alternatively, the 1-2 twisted pair may be used to provide a positive voltage, and the 3-6 twisted pair may be used to provide a negative voltage. In the alternative A, the 4-5 twisted pair and the 7-8 twisted pair are idle. "Idle" in this application means that no power is supplied. When the alternative A is used, the 1-2 twisted pair and the 3-6 twisted pair are power supply twisted pairs, and the 4-5 twisted pair and the 7-8 twisted pair are non-power supply twisted pairs or idle twisted pairs. Correspondingly, the 1-2 pin pair and the 3-6 pin pair are power supply pin pairs, and the 4-5 pin pair and the 7-8 pin pair are non-power supply pin pairs or idle pin pairs. In PoE system, a negative potential is usually used for supplying power. For example, the 1-2 twisted pair provides a voltage of −48 V, and the 3-6 twisted pair provides a voltage of 0 V. Certainly, the 1-2 twisted pair may alternatively provide a voltage of −53 V or a voltage with another value that conforms to a PoE protocol. This is not limited in the present disclosure.

In the alternative B, it is stipulated that the 4-5 twisted pair and the 7-8 twisted pair are used for supplying power, and in the alternative B, the 1-2 twisted pair and the 3-6 twisted pair are idle. When the alternative B is used, the 4-5 twisted pair and the 7-8 twisted pair are power supply twisted pairs, and the 1-2 twisted pair and the 3-6 twisted pair are non-power supply twisted pairs or idle twisted pairs. Correspondingly, the 4-5 pin pair and the 7-8 pin pair are power supply pin pairs, and the 1-2 pin pair and the 3-6 pin pair are non-power supply pin pairs or idle pin pairs.

In the following embodiments of the present disclosure, that a 1-2 twisted pair provides a negative voltage and a 3-6 twisted pair provides a positive voltage is used as an example to describe a surge protection implementation principle provided in the technical solution of the present disclosure. Specifically, in the embodiments, that the 1-2 twisted pair provides a voltage of −48 V and the 3-6 twisted pair provides a voltage of 0 V is used as an example to describe the technical solution provided in the present disclosure. The example is not intended to limit the technical solution provided in the present disclosure.

The present disclosure provides a surge protection circuit, to provide surge protection for power sourcing equipment, and reduce device costs and a device volume. FIG. 1 is a schematic structural diagram of PSE according to an embodiment of the present disclosure. As shown in FIG. 1, the PSE 10 includes a surge protection circuit 100, an Ethernet port 200, and a power supply control circuit 300.

The surge protection circuit 100 is configured to provide surge protection for the power sourcing equipment 10.

The power supply control circuit 300 is configured to control power-on and power-off of the Ethernet port 200. The power supply control circuit 300 includes a PSE chip. The PSE chip is configured to implement functions of the PSE in procedures such as detection, hierarchy, and power supplying in PoE.

The Ethernet port 200 includes a power supply pin group and a non-power supply pin group. The power supply pin group includes a first power supply pin pair and a second power supply pin pair. The non-power supply pin group includes a first non-power supply pin pair and a second non-power supply pin pair.

A power supply of the power sourcing equipment 10 outputs electric power to the power supply pin group, and supplies, through a power supply twisted pair, power to a PD connected to the Ethernet port 200.

In this embodiment of the present disclosure, the Ethernet port 200 that provides a power over Ethernet function in the PSE is also referred to as a PoE port 200.

As shown in FIG. 1, the surge protection circuit 100 includes a first circuit 101, a second circuit 102, and a common discharge circuit 103.

The first circuit 101 is connected to the common discharge circuit 103, and the second circuit 102 is connected to the common discharge circuit 103.

The first circuit 101 is configured to transmit first surge energy to the common discharge circuit 103, to prevent the first surge energy from damaging the power supply control circuit 300. The first surge energy is surge energy that is input from the power supply pin group.

The second circuit 102 is configured to transmit second surge energy to the common discharge circuit 103. The second surge energy is surge energy that is input from the non-power supply pin group.

The common discharge circuit 103 is configured to discharge the first surge energy and the second surge energy. Specifically, the common discharge circuit 103 discharges the first surge energy and the second surge energy to ground, to prevent the first surge energy and the second surge energy from impacting on a power supply system of the power sourcing equipment, so as to protect the power sourcing equipment.

Specifically, as shown in FIG. 1, the first circuit 101 includes a first connection end 1011, a second connection end 1012, and a third connection end 1013. The second circuit 102 includes a fourth connection end 1021, a fifth connection end 1022, and a sixth connection end 1023. The common discharge circuit 103 includes a first common connection end 1031 and a second common connection end 1032.

The first connection end 1011, the fourth connection end 1021, and the first common connection end 1031 are connected to one electrode of the power supply of the power sourcing equipment 10, and connected to the first power supply pin pair (specifically, a center tap of a transformer of the first power supply pin pair). For example, as shown in FIG. 1, the first connection end 1011, the fourth connection end 1021, and the first common connection end 1031 are connected to a positive electrode (V+) of the power supply, and connected to a 3-6 pin pair (specifically, connected to a center tap CT1 of a transformer of the 3-6 pin pair).

The second connection end 1012, the fifth connection end 1022, and the second common connection end 1032 are all connected to the other electrode of the power supply of the power sourcing equipment 10 and a first control end 301 of the power supply control circuit 300. For example, as shown in FIG. 1, the second connection end 1012, the fifth connection end 1022, and the second common connection end 1032 are connected to a negative electrode (V−) of the power supply and the first control end 301 of the power supply control circuit 300.

The third connection end 1013 is connected to the second power supply pin pair (specifically, a center tap of a transformer of the second power supply pin pair) and a second control end 302 of the power supply control circuit 300. For example, as shown in FIG. 1, the third connection end 1013 is connected to a 1-2 pin pair (specifically, connected to a center tap CT2 of a transformer of the 1-2 pin pair) and the second control end 302 of the power supply control circuit 300.

The sixth connection end 1023 is connected to the non-power supply pin group (specifically, connected to a center tap of a transformer of the non-power supply pin group). For example, as shown in FIG. 1, the sixth connection end 1023 is connected to the non-power supply pin group (a 4-5 pin pair and a 7-8 pin pair) (specifically, connected to a center tap CT3 of a transformer of the 4-5 pin pair and a center tap CT4 of a transformer of the 7-8 pin pair).

As shown in FIG. 1, the first connection end 1011 of the first circuit 101 is connected to the positive electrode (V+) of the power supply of the power sourcing equipment 10 and the center tap (CT1) of the transformer of the first power supply pin pair (the 3-6 pin pair). The second connection end 1012 of the first circuit 101 is connected to the negative electrode (V−) of the power supply of the power sourcing equipment 10 and the first control end 301 of the power supply control circuit 300. The third connection end 1013 of the first circuit is connected to the center tap (CT2) of the transformer of the second power supply pin pair (the 1-2 pin pair) and the second control end 302 of the power supply control circuit 300.

As shown in FIG. 1, the fourth connection end 1021 of the second circuit 102 is connected to the positive electrode V+ of the power supply. The fifth connection end 1022 of the second circuit 102 is connected to the negative electrode V− of the power supply. The sixth connection end 1023 of the second circuit 102 is connected to the center taps (the CT3 and the CT4) of the transformers of the non-power supply pin group (the 4-5 pin pair and the 7-8 pin pair).

As shown in FIG. 1, the first common connection end 1031 of the common discharge circuit 103 is connected to the positive electrode V+ of the power supply. The second common connection end 1032 of the common discharge circuit 103 is connected to the negative electrode V− of the power supply.

In the surge protection circuit 100 in this embodiment of the present disclosure, a surge that is input from the power supply pin group is led to the common discharge circuit 103 through the first circuit 101, and a surge that is input from the non-power supply pin group is led to the common discharge circuit 103 through the second circuit 102. In this way, the common discharge circuit 103 can discharge surge energy that is input from a PoE port, and there is no need to respectively deploy two discharge circuits for a surge that is input from the power supply pin group and a surge that is input from the non-power supply pin group. This not only prevents a device from being damaged, but also reduces surge protection costs, used for the PoE port, of the power sourcing equipment, so as to reduce costs of the entire device.

Figure 2:
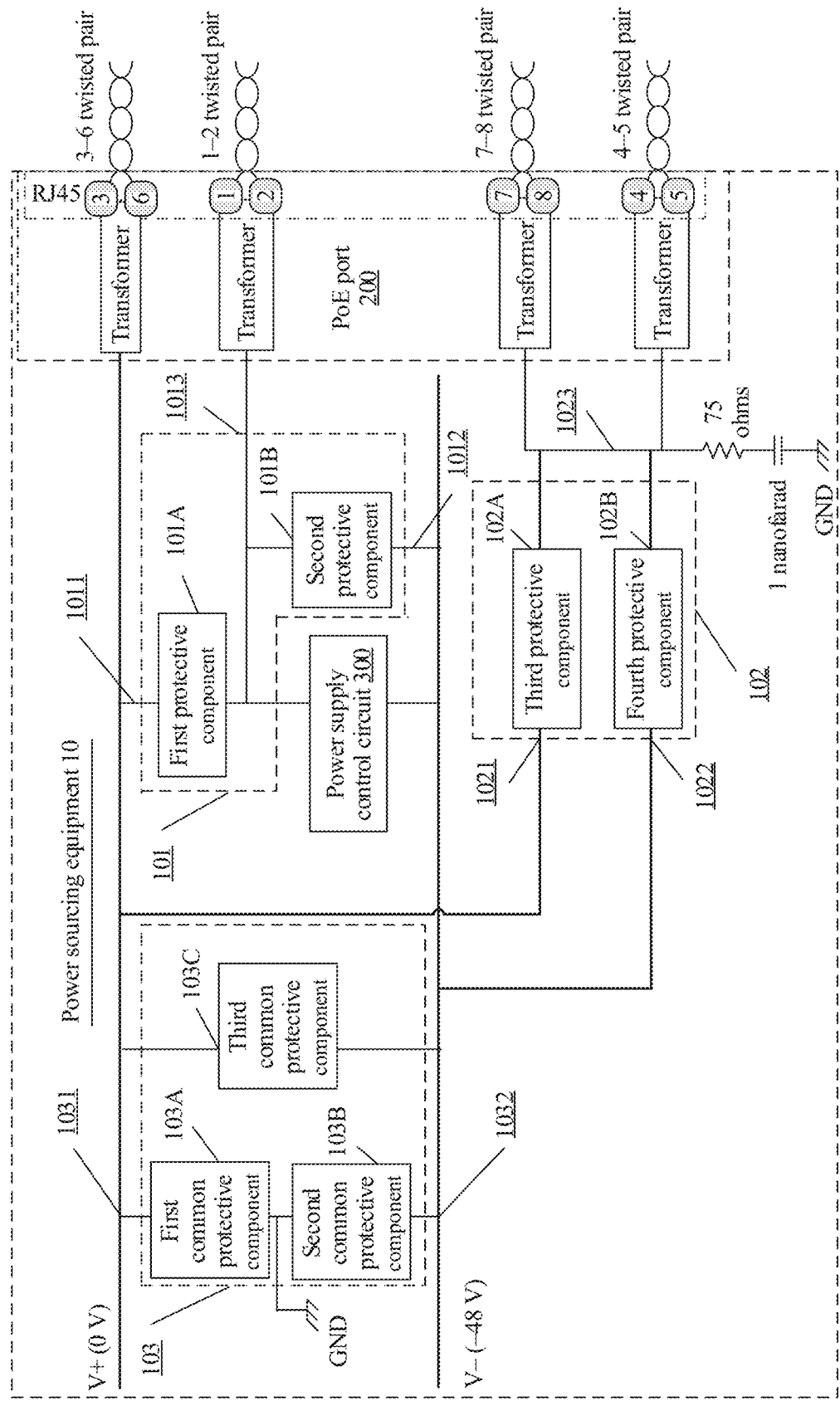
FIG. 2 is a schematic diagram of a surge protection circuit in PSE according to an embodiment of the present disclosure.

Further, based on the power sourcing equipment 10 shown in FIG. 1, FIG. 2 is a schematic diagram of a surge protection circuit in the PSE according to an embodiment of the present disclosure.

The first circuit 101 includes a first protective component 101A and a second protective component 101B.

The first protective component 101A and the second protective component 101B each may be a diode, or may be a transient voltage suppressor (TVS), for example, a TVS diode, and each may be specifically selected based on an actual requirement.

A TVS is a collective term of a device array configured to respond to a sudden or instantaneous overvoltage condition. A TVS diode has extremely short response time (generally in a sub-nanosecond level) and a quite high surge absorption capability. When two ends of the TVS diode are impacted by instantaneous high energy, the TVS diode can change impedance between the two ends from a large impedance value to a small impedance value extremely quickly, to absorb an instantaneous large current (it is possible to absorb surge power up to several kilowatts). A voltage between the two ends of the TVS diode is controlled to a preset value, to protect another component in the circuit from being damaged by a transient high voltage (a surge pulse).

A first end of the first protective component 101A is connected to the first connection end 1011 of the first circuit 101 (that is, connected to the positive electrode V+ of the power supply). A second end of the first protective component 101A is connected to the third connection end 1013 of the first circuit 101 (that is, connected to the CT2). A first end of the second protective component 101B is connected to the third connection end 1013, and a second end of the second protective component 101B is connected to the second connection end 1012 of the first circuit 101 (that is, connected to the negative electrode V− of the power supply).

The second circuit 102 includes a third protective component 102A and a fourth protective component 102B. The third protective component 102A may be a diode (as shown in FIG. 2), or may be a TVS, for example, a TVS diode. The fourth protective component 102B may be a diode, or may be a TVS.

As shown in FIG. 2, that the third protective component 102A and the fourth protective component 102B each are a diode is used as an example. Certainly, the third protective component 102A and the fourth protective component 102B each may be another component having the same function, and may be selected based on costs and protective performance. This is not limited in the present disclosure.

A first end of the third protective component 102A is connected to the fourth connection end 1021 of the second circuit 102 (that is, connected to the positive electrode V+ of the power supply). A second end of the fourth protective component 102B is connected to the fifth connection end 1022 of the second circuit 102 (that is, connected to the negative electrode V− of the power supply). A second end of the third protective component 102A and a first end of the fourth protective component 102B are connected together and connected to the sixth connection end 1023 of the second circuit 102 (that is, connected to the CT3 and the CT4).

The common discharge circuit 103 includes a first common protective component 103A, a second common protective component 103B, and a third common protective component 103C.

The first common protective component 103A may be a varistor, or may be a gas discharge tube, and the second common protective component 103B may be a varistor, or may be a gas discharge tube. The third common protective component 103C may be a diode, or may be a TVS, for example, a TVS diode, and may be specifically selected based on an actual requirement.

A first end of the first common protective component 103A is connected to the first common connection end 1031 of the common discharge circuit 103 (that is, connected to the positive electrode V+ of the power supply). A second end of the first common protective component 103A and a first end of the second common protective component 103B are connected together and grounded (GND). A second end of the second common protective component 103B is connected to the second common connection end 1032 of the common discharge circuit 103 (that is, connected to the negative electrode V− of the power supply).

A first end of the third common protective component 103C is connected to the first common connection end 1031, and a second end of the third common protective component 103C is connected to the second common connection end 1032. The third common protective component 103C is mainly configured to ensure that a voltage between the positive electrode of the power supply and the negative electrode of the power supply is within a preset range, to prevent a surge from causing a voltage difference between the positive electrode and the negative electrode of the power supply to be not within the preset range, and prevent the power supply from being impacted and damaged. The preset range may be set based on a power supply voltage specified according to a PoE protocol, for example, set to 0 V to 63 V or 0 V to 57 V. Specifically, when a surge causes an electric potential of the positive electrode of the power supply to be lower than an electric potential of the negative electrode of the power supply, the third common protective component 103C may perform shunting to discharge the surge, so that the electric potential of the positive electrode of the power supply is higher than the electric potential of the negative electrode of the power supply, in other words, the voltage between the positive electrode and the negative electrode of the power supply is greater than a lower limit of the preset range. When a surge causes an excessively large voltage difference, for example, greater than 63 V, between the positive electrode and the negative electrode of the power supply, the third common protective component may perform voltage division to discharge the surge, so that the voltage between the positive electrode and the negative electrode of the power supply is less than an upper limit of the preset range.

Based on the surge protection circuit provided in this embodiment of the present disclosure, only a component, such as a diode or a TVS, whose volume is small and whose costs are low may be used to implement the second circuit 102, to discharge, through the common discharge circuit 103, surge energy that is input from the non-power supply pin group, and there is no need to dedicatedly deploy an independent discharge circuit for the non-power supply pin group. For power sourcing equipment with a plurality of PoE ports, this can reduce a device volume and costs more significantly.

Figure 3:
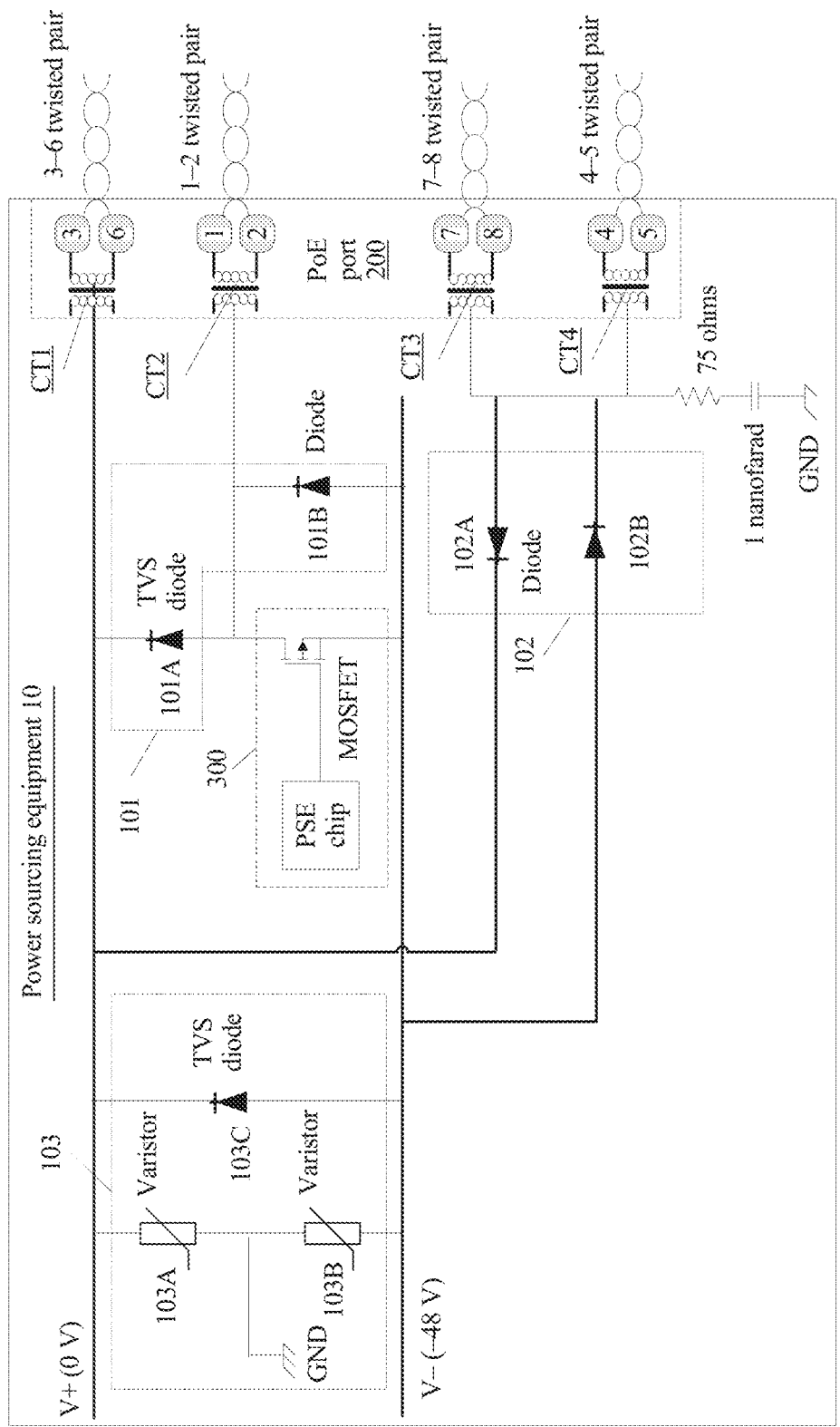
FIG. 3 is a schematic implementation diagram of a surge protection circuit in PSE according to an embodiment of the present disclosure.

FIG. 3 is a schematic implementation diagram of a surge protection circuit in PSE according to an embodiment of the present disclosure.

As described above, the power sourcing equipment 10 includes the surge protection circuit 100, the PoE port 200, and the power supply control circuit 300. The surge protection circuit 100 includes the first circuit 101, the second circuit 102, and the common discharge circuit 103.

In this embodiment of the present disclosure, the power supply control circuit 300 may be a PSE chip, and the PSE chip may include a microcontroller, a memory, a control switch, and the like. The PSE chip is configured to control power-on and power-off of the PoE port 200, to be specific, configured to control the power supply of the power sourcing equipment 10 to output electric power (power-on) or stop outputting electric power (power-off) to the power supply pin pair of the PoE port 200.

In another implementation, the power supply control circuit 300 may include a PSE chip and a control switch (as shown in FIG. 3). The PSE chip may include a microcontroller, a memory, a current detection circuit, and the like. The PSE chip outputs a control signal to the control switch, to control power-on and power-off of the PoE port 200.

The control switch may be implemented by a relay, an optocoupler, a metal-oxide semiconductor field-effect transistor (MOSFET), or a transistor. In FIG. 3, that the control switch is implemented by the MOSFET is used as an example, and no limitation is imposed on the control switch in the present disclosure.

In FIG. 3, that the power supply control circuit 300 includes the PSE chip and the control switch is used as an example to describe the technical solution in the present disclosure. The example imposes no limitation on the power supply control circuit 300 in the present disclosure.

As shown in FIG. 3, the first protective component 101A is a TVS diode, and the second protective component 101B is a diode. The first end of the first protective component 101A, namely, a cathode of the TVS diode 101A, is connected to the positive electrode V+ of the power supply and the center tap CT1 of the transformer of the first power supply pin pair (the 3-6 pin pair). The second end of the second protective component 101B, namely, an anode of the diode 101B, is connected to the negative electrode V− of the power supply. The second end of the first protective component 101A, namely, an anode of the TVS diode 101A, and the first end of the second protective component 101B, namely, a cathode of the diode 101B, are connected together and connected to the center tap CT2 of the transformer of the second power supply pin pair (the 1-2 pin pair).

As shown in FIG. 3, the third protective component 102A and the fourth protective component each are a diode. The first end of the third protective component 102A, namely, a cathode of the diode 102A, is connected to the positive electrode V+ of the power supply. The second end of the fourth protective component 102B, namely, an anode of the diode 102B, is connected to the negative electrode V− of the power supply. The second end of the third protective component 102A, namely, an anode of the diode 102A, and the first end of the fourth protective component 102B, namely, a cathode of the diode 102B, are connected together and connected to the center taps CT3 and CT4 of the transformers of the non-power supply pin group (the 4-5 pin pair and the 7-8 pin pair).

As shown in FIG. 3, the first common protective component 103A and the second common protective component 103B each are a varistor, and the third common protective component 103C is a TVS diode. The first end of the varistor 103A is connected to the positive electrode V+ of the power supply. The second end of the varistor 103B is connected to the negative electrode V− of the power supply. The second end of the varistor 103A and the first end of the varistor 103B are connected together and grounded.

The first end of the third common protective component 103C, namely, a cathode of the TVS diode 103C, is connected to the positive electrode V+ of the power supply, and the second end of the third common protective component 103C, namely, an anode of the TVS diode 103C, is connected to the negative electrode V− of the power supply. In this way, when a surge causes an electric potential of the positive electrode of the power supply to be lower than an electric potential of the negative electrode of the power supply, in other words, when a voltage between the positive electrode and the negative electrode of the power supply is less than 0 V, the third common protective component 103C (namely, the TVS diode) may perform shunting to transmit a current to the first power supply pin pair, so as to discharge the surge. When a surge causes an excessively large voltage difference, for example, greater than 57 V, between the positive electrode and the negative electrode of the power supply, the third common protective component 103C (namely, the TVS diode) is reverse breakdown, to implement voltage division, and discharge the surge, so that the voltage between the positive electrode and the negative electrode of the power supply is less than 57 V.

Figure 4A:
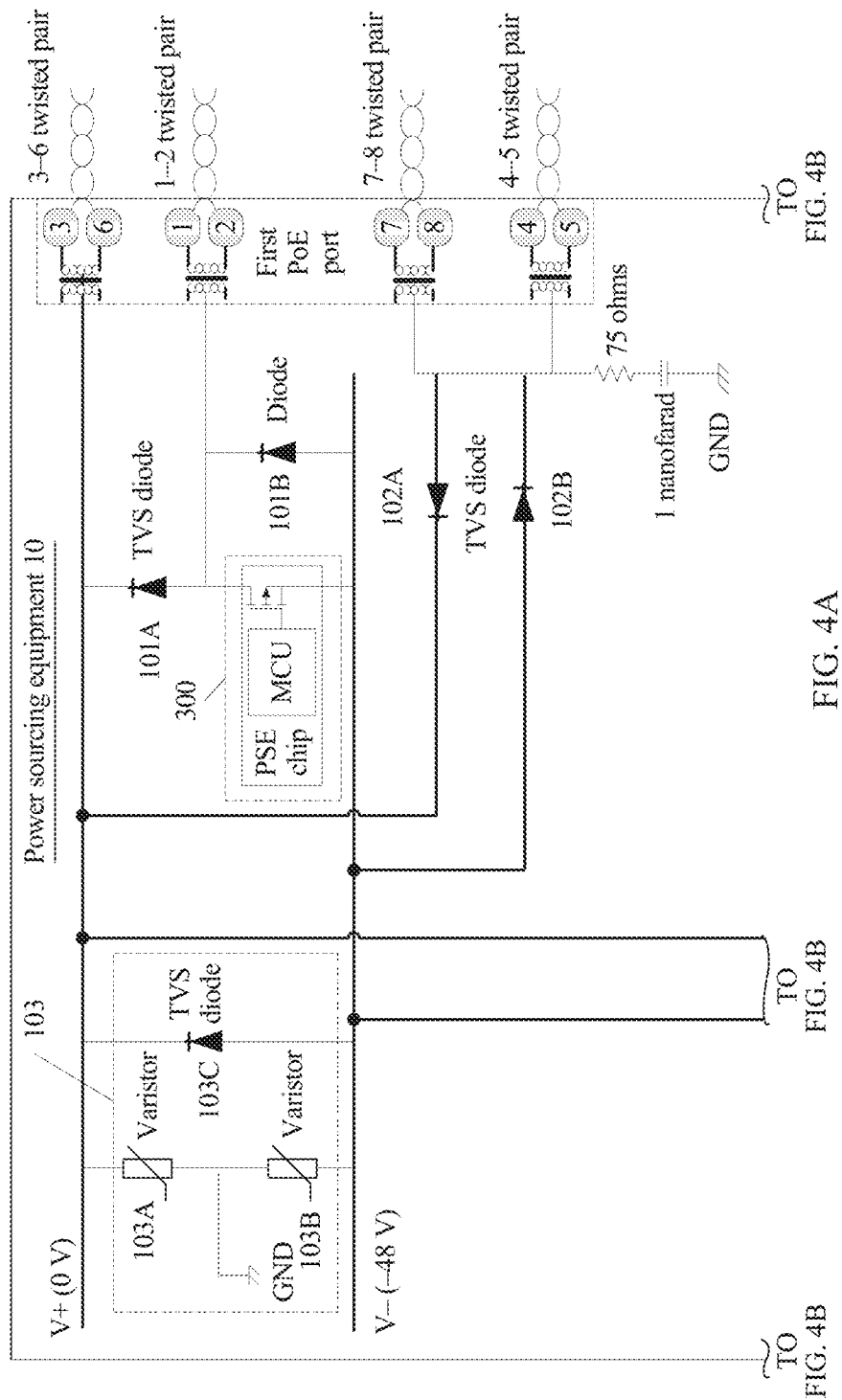
FIG. 4A and FIG. 4B are schematic diagrams of surge protection circuits of a plurality of ports in PSE according to an embodiment of the present disclosure.
Figure 4B:
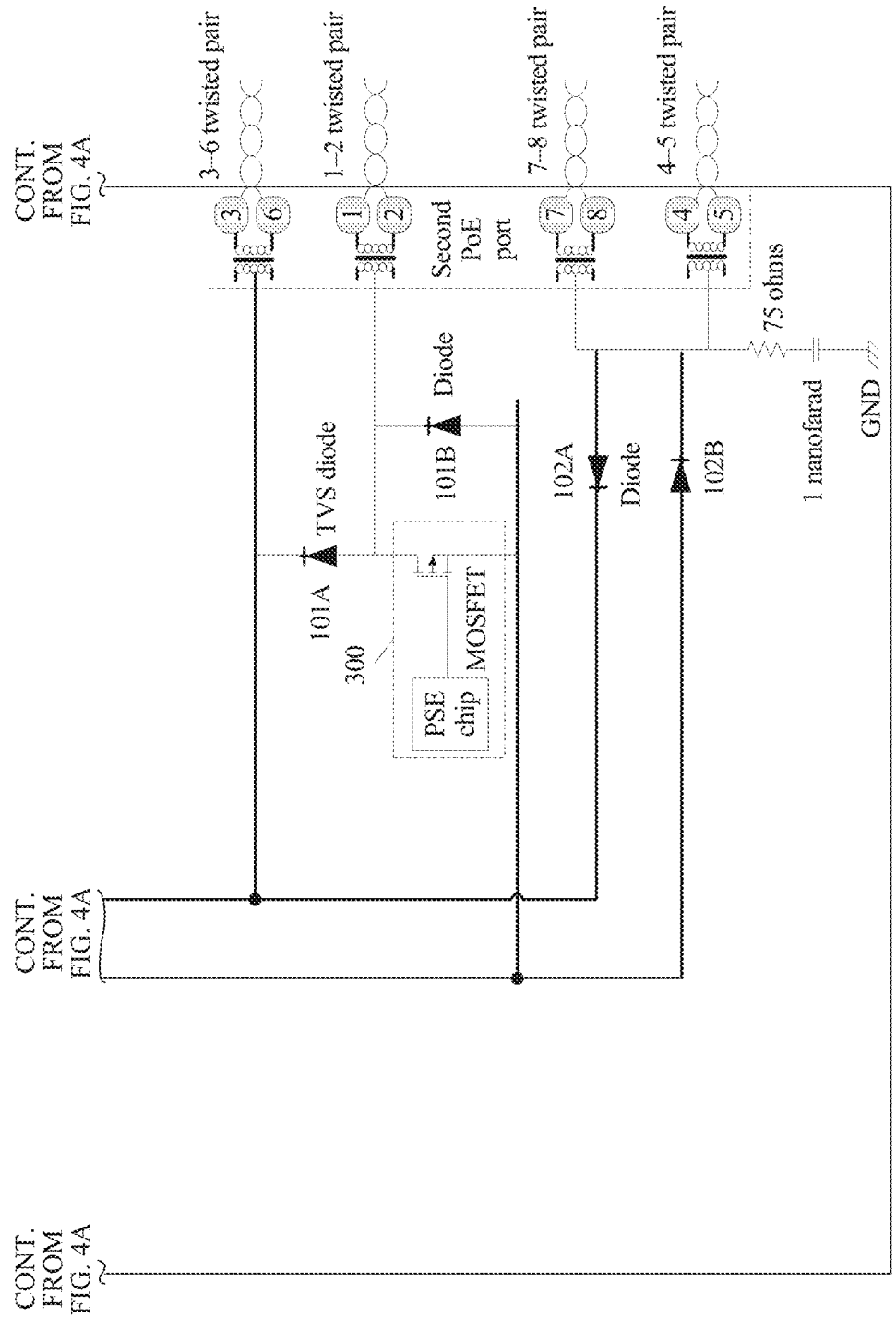

In each of FIG. 1 to FIG. 3, a surge protection circuit of one PoE port in the power sourcing equipment 10 is used as an example. Certainly, the power sourcing equipment 10 may include a plurality of PoE ports 200. Each PoE port of the power sourcing equipment may use a surge protection circuit having a same principle as that shown in each of FIG. 1 to FIG. 3. The surge protection circuit 100 includes a first circuit 101 and a second circuit 102 whose quantities are the same as that of PoE ports. For example, if there are three PoE ports, there are three first circuits 101 and three second circuits 102. Each PoE port corresponds to one first circuit 101 and one second circuit 102. For example, FIG. 4A and FIG. 4B are schematic diagrams of surge protection circuits of a plurality of ports (for example, two ports) in power sourcing equipment according to an embodiment of the present disclosure.

In addition, protective components in the surge protection circuits of the PoE ports in the power sourcing equipment may not be the same. For example, for surge protection circuits of two PoE ports in the PSE shown in FIG. 4A and FIG. 4B, a TVS diode is used in a second circuit of a first PoE port, and a diode is used in a second circuit of a second PoE port. The present disclosure imposes no limitation on mandatory use of same electronic devices, provided that the electronic components can implement a same function.

The power sourcing equipment 10 shown in each of FIG. 1 to FIG. 4B includes only one power supply. In a possible implementation, alternatively, in the power sourcing equipment 10, one power supply may be configured for a first PoE port to supply power, and another power supply may be configured for a second PoE port to supply power. In other words, a quantity of power supplies in the power sourcing equipment 10 is not limited to one. Correspondingly, the power sourcing equipment 10 includes a common discharge circuit 103 whose quantity is the same as that of power supplies. A surge protection circuit of the first PoE port and a surge protection circuit of the second PoE port are independent of each other. It may be understood that the surge protection circuits are two independent surge protection circuits shown in FIG. 4A and FIG. 4B. For example, FIG.

Figure 5A:
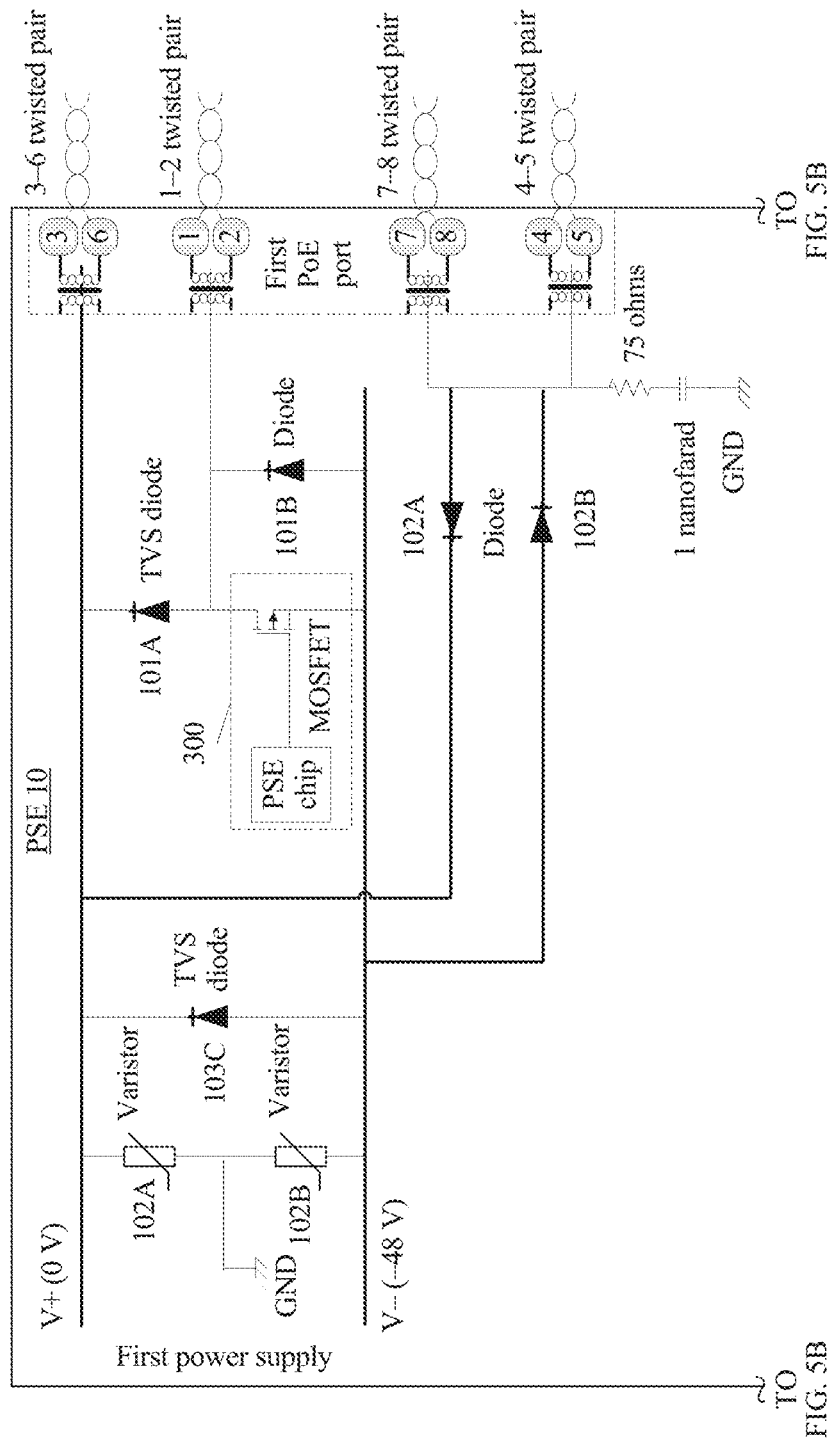
FIG. 5A and FIG. 5B are schematic diagrams of surge protection circuits corresponding to a plurality of power supplies in PSE according to an embodiment of the present disclosure.
Figure 5B:
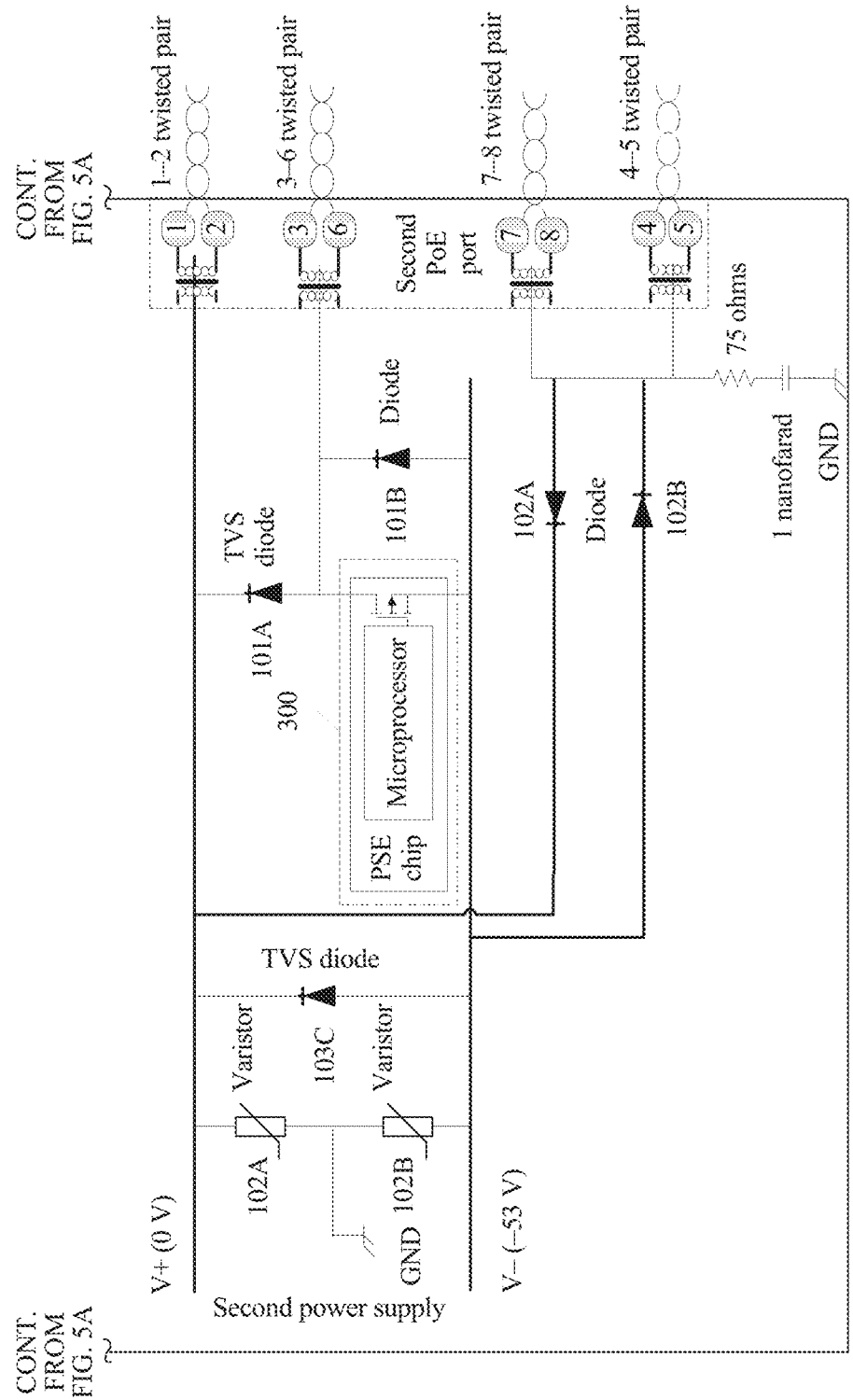

5A and FIG. 5B are schematic diagrams of surge protection circuits corresponding to two power supplies in PSE according to an embodiment of the present disclosure.

Figure 6:
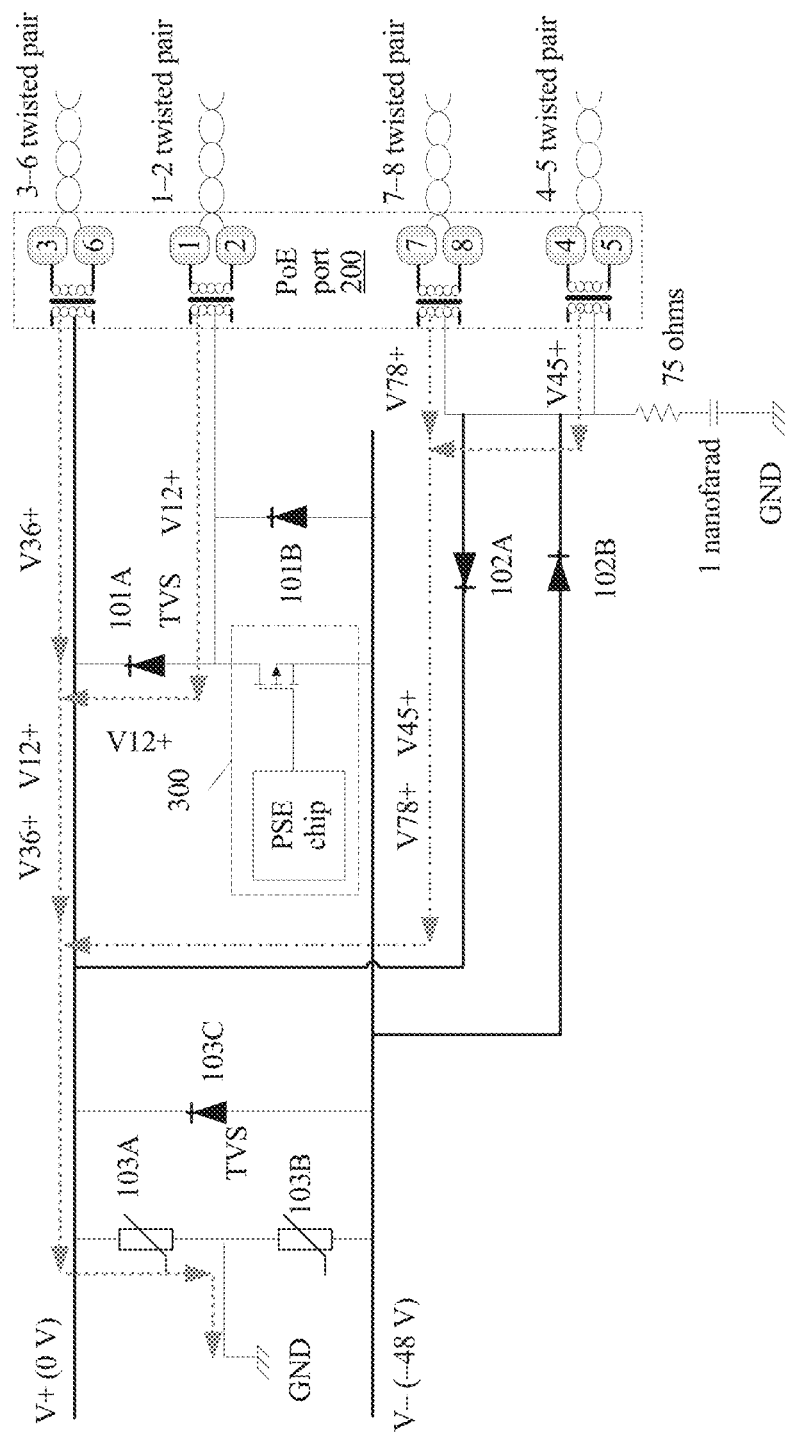
FIG. 6 is a schematic diagram of discharging a positive surge according to an embodiment of the present disclosure.
Figure 7:
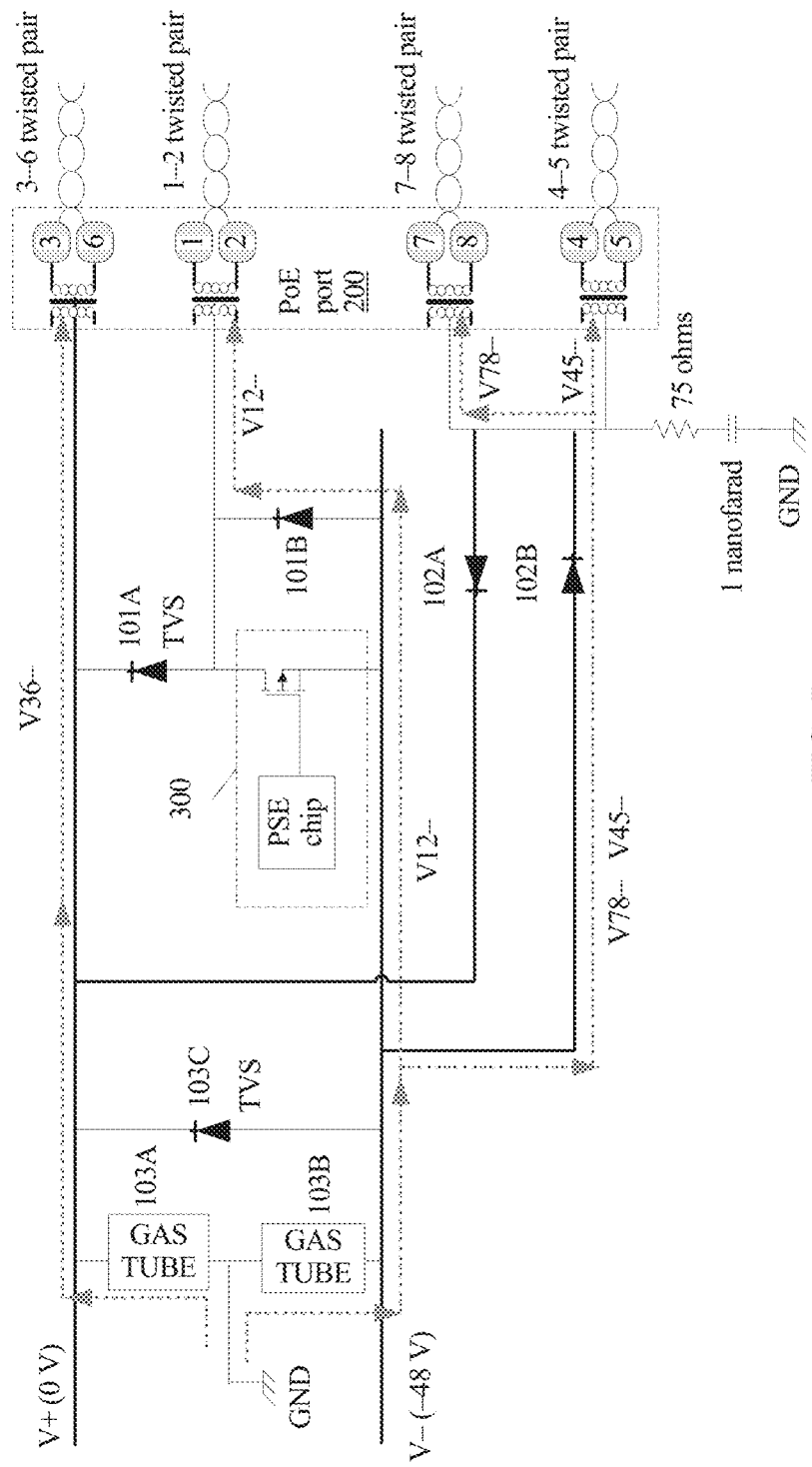
FIG. 7 is a schematic diagram of discharging a negative surge according to an embodiment of the present disclosure.

FIG. 6 is a schematic diagram of a positive surge discharge (protection) principle. FIG. 7 is a schematic diagram of a negative surge discharge principle. In the power sourcing equipment shown in each of FIG. 6 and FIG. 7, that a 1-2 twisted pair provides a voltage of −48 V and a 3-6 twisted pair provides a voltage of 0 V is used as an example.

As shown in FIG. 6, when a positive surge (a transient high voltage is a positive voltage, for example, +2000 V) is generated, the surge is input from the power supply pin group and the non-power supply pin group of the PoE port 200 to the power sourcing equipment 10, and surge energy may be led to the common discharge circuit through the first circuit and the second circuit, to discharge the positive surge energy.

Specifically, when a positive surge (indicated by a symbol V36+ in FIG. 6) on the 3-6 twisted pair arrives at the first connection end 1011 of the first circuit 101, a TVS diode that implements the first protective component 101A performs reverse cut-off. This prevents surge energy from flowing into the power supply control circuit 300, and can prevent the surge energy from damaging the power supply control circuit 300. The V36+ arrives at the first common connection end 1031 of the common discharge circuit 103, and a TVS diode that implements the third common protective component 103C performs reverse cut-off, to prevent the surge energy from impacting on the power supply; and the V36+ is discharged to ground by using a varistor that implements the first common protective component 103A.

When a positive surge (indicated by a symbol V12+ in FIG. 6) on the 1-2 twisted pair arrives at the third connection end 1013 of the first circuit 101, the TVS diode that implements the first protective component 101A performs forward conduction, and a diode that implements the second protective component 101B performs reverse cut-off. This prevents surge energy from flowing into the power supply control circuit 300, and can prevent the surge energy from damaging the power supply control circuit 300. The V12+ is led to the first common connection end 1031 of the common discharge circuit 103 by using the first protective component 101A, and then is discharged to ground by using the varistor that implements the first common protective component 103A.

When positive surges (indicated by symbols V45+ and V78+ in FIG. 6) on a 4-5 twisted pair and a 7-8 twisted pair arrive at the sixth connection end 1023 of the second circuit 102, a diode that implements the fourth protective component 102B performs reverse cut-off, and a diode that implements the third protective component 102A performs forward conduction. The V45+ and the V78+ are led to the first common connection end 1031 of the common discharge circuit 103 by using the third protective component 102A, and then are discharged to ground by using the varistor that implements the first common protective component 103A.

In FIG. 6, the V12+, the V36+, the V45+, and the V78+ each are merely used to show a path of the positive surge, but not used to differentiate an energy amount (or a voltage value) of the positive surge. In actual application, after the positive surge is input to the PoE port 200, energy (voltage values) on different wires may be the same or different.

As shown in FIG. 7, when a negative surge (a transient high voltage is a negative voltage, for example, −2000 V) is generated, the surge is input from the power supply pin group and the non-power supply pin group of the PoE port 200 to the power sourcing equipment, and surge energy may be led to the common discharge circuit through the first circuit and the second circuit, to discharge the negative surge energy.

Specifically, when a negative surge (indicated by a symbol V36− in FIG. 7) on the 3-6 twisted pair arrives at the first connection end 1011 of the first circuit 101, a TVS diode that implements the first protective component 101A performs reverse cut-off. This can prevent surge energy from damaging the power supply control circuit 300. The V36− arrives at the first common connection end 1031 of the common discharge circuit 103, and a TVS diode that implements the third common protective component 103C performs reverse cut-off, to prevent the surge energy from impacting on the power supply; and the V36− is discharged to ground by using a gas discharge tube that implements the first common protective component 103A.

When a negative surge (indicated by a symbol V12− in FIG. 7) formed on the 1-2 twisted pair arrives at the third connection end 1013 of the first circuit 101, a diode that implements the second protective component 101B performs forward conduction. The V12− arrives at the second connection end 1012 of the common discharge circuit 103 by using the second protective component 101B, and then is discharged to ground by using a gas discharge tube that implements the second common protective component 103B.

When negative surges (indicated by symbols V45− and V78− in FIG. 7) formed on a 4-5 twisted pair and a 7-8 twisted pair arrive at the sixth connection end 1023 of the second circuit 102, a diode that implements the third protective component 102A performs reverse cut-off, and a diode that implements the fourth protective component 102B performs forward conduction. The V45− and the V78− arrive at the second connection end 1012 of the common discharge circuit 103 by using the fourth protective component 102B, and then are discharged to ground by using the gas discharge tube that implements the second common protective component 103B.

In FIG. 7, the V12−, the V36−, the V45−, and the V78− each are merely used to show a path of the negative surge, but not used to differentiate an energy amount of the negative surge. In actual application, after the negative surge is input to the PoE port 200, energy (voltage values) on different wires may be the same or different.

Figures 8, 9:
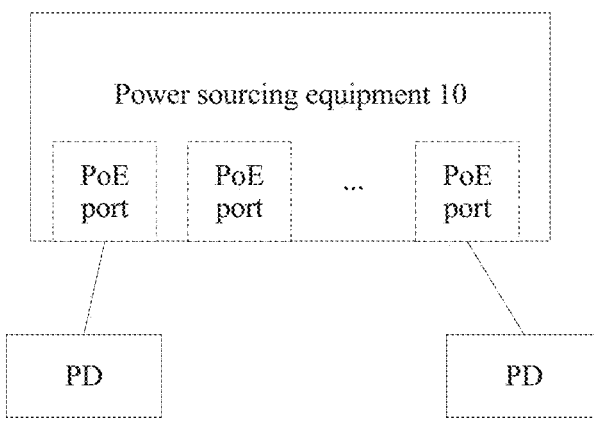
FIG. 8 is a schematic structural diagram of a power supply system according to an embodiment of the present disclosure.
FIG. 9 is a schematic flowchart of a surge protection method according to an embodiment of the present disclosure.

FIG. 8 is a schematic structural diagram of a PoE system according to an embodiment of the present disclosure. The PoE system includes the power sourcing equipment 10 provided in the embodiments of the present disclosure and a PD. The power sourcing equipment includes at least one PoE port. Each of the at least one PoE port may be connected to one PD and supply power to the PD.

Referring to FIG. 9, an embodiment of the present disclosure provides a surge protection method that is used in the foregoing power sourcing equipment 10. The surge protection method includes the following steps.

Step 901: When a positive surge is generated on a first Ethernet port, a surge protection circuit corresponding to the first Ethernet port discharges the positive surge to ground.

Step 902: When a negative surge is generated on the first Ethernet port, the surge protection circuit corresponding to the first Ethernet port discharges the negative surge to ground.

Specifically, when positive surges are generated on the first Ethernet port, the PSE discharges a positive surge on a power supply twisted pair of the first Ethernet port to a common discharge circuit through a first circuit of the surge protection circuit corresponding to the first Ethernet port, to discharge the positive surge to ground through the common discharge circuit, and discharges a positive surge on a non-power supply twisted pair of the first Ethernet port to the common discharge circuit through a second circuit of the surge protection circuit, to discharge the positive surge to ground through the common discharge circuit.

When negative surges are generated on the first Ethernet port, the PSE discharges a negative surge on the power supply twisted pair of the first Ethernet port to the common discharge circuit through the first circuit, to discharge the negative surge to ground through the common discharge circuit, and discharges a negative surge on the non-power supply twisted pair of the first Ethernet port to the common discharge circuit through the second circuit, to discharge the negative surge to ground through the common discharge circuit.

Optionally, the PSE includes at least one Ethernet port, and the first Ethernet port is any one of the at least one Ethernet port.

For the power sourcing equipment in the embodiments of the present disclosure, merely a module or a component related to the present disclosure is shown. It may be understood that the power sourcing equipment may further include other components such as a processor, a memory, a physical layer (PHY) chip, and another hardware chip.

In the embodiments of the present disclosure, the PoE is used as an example to describe how the power sourcing equipment prevents surge impact generated when a PoE port suffers a lightning strike. The foregoing method is also applicable to a scenario, for example, power over data lines (PoDL), in which a similar power supplying technology is used. In a PoDL scenario, adaptive modifications, variations, or replacements made by a person skilled in the art for different protocols based on the embodiments of the present disclosure shall fall within the protection scope of the present disclosure.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. Power sourcing equipment (PSE) for power over Ethernet (PoE), the PSE comprising:
   a first power supply control circuit;
   a first Ethernet port comprising:
      a first power supply pin group configured to receive a first surge, and
      a first non-power supply pin group configured to receive a second surge;
   a surge protection circuit comprising:
      a first circuit coupled to the first power supply control circuit and the first power supply pin group and configured to receive the first surge from the first power supply pin group, and
      a second circuit coupled to the first non-power supply pin group and configured to receive the second surge from the first non-power supply pin group; and
   a first common discharge circuit coupled to the first circuit and the second circuit and configured to:
      receive the first surge from the first circuit,
      discharge the first surge,
      receive the second surge from the second circuit, and
      discharge the second surge.

2. The PSE of claim 1, wherein the first power supply pin group comprises a first power supply pin pair and a second power supply pin pair, wherein the first circuit comprises a first connection end, a second connection end, and a third connection end, wherein the second circuit comprises a fourth connection end, a fifth connection end, and a sixth connection end, wherein the first common discharge circuit comprises a first common connection end and a second common connection end, wherein the first connection end and the first common connection end are coupled to a first electrode of a first power supply of the PSE and coupled to the first power supply pin pair, wherein the second connection end and the second common connection end are coupled to a second electrode of the first power supply and coupled to a first control end of the first power supply control circuit, wherein the third connection end is coupled to the second power supply pin pair and coupled to a second control end of the first power supply control circuit, wherein the fourth connection end is coupled to the first electrode, wherein the fifth connection end is coupled to the second electrode, and wherein the sixth connection end is coupled to the first non-power supply pin group.

3. The PSE of claim 2, wherein the first circuit comprises a first protective component and a second protective component, wherein a first end of the first protective component is coupled to the first connection end, a second end of the first protective component and a first end of the second protective component are coupled to the third connection end, wherein a second end of the second protective component is coupled to the second connection end, wherein the first surge comprises a first sub-surge and a second sub-surge, wherein the first power supply pin pair is configured to input the first sub-surge, wherein the second power supply pin pair is configured to input the second sub-surge, wherein the first protective component is configured to prevent the first sub-surge from flowing into the first power supply control circuit and transmit the second sub-surge to the first common connection end when the first surge is a positive surge, wherein the second protective component is configured to prevent the second sub-surge from flowing into the first power supply control circuit when the first surge is the positive surge or the first protective component is further configured to prevent the first sub-surge from flowing into the first power supply control circuit, when the first surge is a negative surge, wherein the second protective component is further configured to transmit the second sub-surge to the second common connection end when the first surge is the negative surge, wherein a voltage of the positive surge is positive, and wherein a voltage of the negative surge is negative.

4. The PSE of claim 2, wherein the second circuit comprises a third protective component and a fourth protective component, wherein a first end of the third protective component is coupled to the fourth connection end, wherein a second end of the fourth protective component is coupled to the fifth connection end, wherein a second end of the third protective component and a first end of the fourth protective component are coupled to the sixth connection end, wherein the third protective component is configured to transmit the second surge to the first common connection end when the second surge is a positive surge, and wherein the fourth protective component is configured to transmit the second surge to the second common connection end when the second surge is a negative surge.

5. The PSE of claim 4, wherein the third protective component is a diode or a transient voltage suppressor (TVS), and wherein the fourth protective component is a diode or a TVS.

6. The PSE of claim 2, wherein the first common discharge circuit comprises a first common protective component and a second common protective component, wherein a first end of the first common protective component is coupled to the first common connection end, wherein a second end of the first common protective component and a first end of the second common protective component are grounded, wherein a second end of the second common protective component is coupled to the second common connection end, wherein the first common protective component is configured to discharge a surge received from the first common connection end to ground, and wherein the second common protective component is configured to discharge a surge received from the second common connection end to ground.

7. The PSE of claim 6, wherein the first common protective component is a varistor or a gas discharge tube, and wherein the second common protective component is a varistor or a gas discharge tube.

8. The PSE of claim 6, wherein the first common discharge circuit further comprises a third common protective component, wherein a first end of the third common protective component is coupled to the first common connection end, wherein a second end of the third common protective component is coupled to the second common connection end, and wherein the third common protective component is configured to ensure that a voltage between a positive electrode and a negative electrode of the first power supply is within a preset voltage range.

9. The PSE of claim 1, further comprising a second Ethernet port and a second power supply control circuit, wherein the second Ethernet port comprises a second power supply pin group and a second non-power supply pin group, wherein the surge protection circuit further comprises a third circuit and a fourth circuit, wherein the third circuit is coupled to the second power supply pin group, the second power supply control circuit, and the first common discharge circuit, wherein the fourth circuit is connected to the second non-power supply pin group and the first common discharge circuit, wherein the third circuit is configured to transmit a third surge to the first common discharge circuit, wherein the PSE is configured to input the third surge from the second power supply pin group, wherein the fourth circuit is configured to transmit a fourth surge to the first common discharge circuit, wherein the PSE is further configured to input the fourth surge from the second non-power supply pin group, and wherein the first common discharge circuit is further configured to discharge the third surge and the fourth surge.

10. The PSE of claim 1, further comprising a third Ethernet port, a third power supply control circuit, and a second power supply, wherein the surge protection circuit further comprises a fifth circuit, a sixth circuit, and a second common discharge circuit, wherein the second common discharge circuit is coupled to the second power supply, wherein the third Ethernet port comprises a third power supply pin group and a third non-power supply pin group, wherein the fifth circuit is coupled to the third power supply pin group, the third power supply control circuit, and the second common discharge circuit, wherein the sixth circuit is coupled to the third non-power supply pin group and the second common discharge circuit, wherein the fifth circuit is configured to transmit a fifth surge to the second common discharge circuit, wherein the PSE is configured to input the fifth surge from the third power supply pin group, wherein the sixth circuit is configured to transmit a sixth surge to the second common discharge circuit, wherein the PSE is further configured to input the sixth surge from the third non-power supply pin group, and wherein the second common discharge circuit is configured to discharge the fifth surge and the sixth surge.

11. A power over Ethernet system comprising:
a powered device (PD); and
a power sourcing equipment (PSE) comprising:
  a first power supply control circuit;
  a first Ethernet port configured to couple to the PD using an Ethernet cable and comprising:
    a first power supply pin group configured to receive a first surge, and
    a first non-power supply pin group configured to receive a second surge;
  a surge protection circuit comprising:
    a first circuit coupled to the first power supply control circuit and the first power supply pin group and configured to receive the first surge from the first power supply pin group, and
    a second circuit coupled to the first non-power supply pin group and configured to receive the second surge from the first non-power supply pin group;
  a first common discharge circuit coupled to the first circuit and the second circuit and configured to:
    receive the first surge from the first circuit,
    discharge the first surge,
    receive the second surge from the second circuit, and
    discharge the second surge; and
  a power supply configured to:
    output electric power to the first power supply pin group, and
    supply power to the PD through a power supply twisted pair of the Ethernet cable.

12. The power over Ethernet system of claim 11, wherein the first power supply pin group comprises a first power supply pin pair and a second power supply pin pair, wherein the first circuit comprises a first connection end, a second connection end, and a third connection end, wherein the second circuit comprises a fourth connection end, a fifth connection end, and a sixth connection end, wherein the first common discharge circuit comprises a first common connection end and a second common connection end, wherein the first connection end and the first common connection end are coupled to a first electrode of a first power supply of the PSE and to the first power supply pin pair, wherein the second connection end and the second common connection end are coupled to a second electrode of the first power supply, and a first control end of the first power supply control circuit, wherein the third connection end is coupled to the second power supply pin pair and a second control end of the first power supply control circuit, wherein the fourth connection end is coupled to the first electrode of the first power supply, wherein the fifth connection end is coupled to the second electrode of the first power supply, and wherein the sixth connection end is coupled to the first non-power supply pin group.

13. The power over Ethernet system of claim 12, wherein the first circuit comprises a first protective component and a second protective component, wherein a first end of the first protective component is coupled to the first connection end, wherein a second end of the first protective component and a first end of the second protective component are coupled to the third connection end, wherein a second end of the second protective component is coupled to the second connection end, wherein the first surge comprises a first sub-surge and a second sub-surge, wherein the first power supply pin pair is configured to input the first sub-surge, wherein the second power supply pin pair is configured to input the second sub-surge, wherein the first protective component is configured to prevent the first sub-surge from flowing into the first power supply control circuit and transmit the second sub-surge to the first common connection end when the first surge is a positive surge, wherein the second protective component is configured to prevent the second sub-surge from flowing into the first power supply control circuit when the first surge is the positive surge or the first protective component is further configured to prevent the first sub-surge from flowing into the first power supply control circuit when the first surge is a negative surge, wherein the second protective component is further configured to transmit the second sub-surge to the second common connection end when the first surge is the negative surge, wherein a voltage of the positive surge is positive, and wherein a voltage of the negative surge is negative.

14. The power over Ethernet system of claim 12, wherein the second circuit comprises a third protective component and a fourth protective component, wherein a first end of the third protective component is coupled to the fourth connection end, a second end of the fourth protective component is coupled to the fifth connection end, and a second end of the third protective component and a first end of the fourth protective component are coupled to the sixth connection end, wherein the third protective component is configured to transmit the second surge to the first common connection end when the second surge is a positive surge, and wherein the fourth protective component is configured to transmit the second surge to the second common connection end when the second surge is a negative surge.

15. The power over Ethernet system of claim 12, wherein the first common discharge circuit comprises a first common protective component and a second common protective component, wherein a first end of the first common protective component is coupled to the first common connection end, wherein a second end of the first common protective component and a first end of the second common protective component are grounded, wherein a second end of the second common protective component is coupled to the second common connection end, wherein the first common protective component is configured to discharge a surge received from the first common connection end to ground, and wherein the second common protective component is configured to discharge a surge received from the second common connection end to ground.

16. The power over Ethernet system of claim 15, wherein the first common discharge circuit further comprises a third common protective component, wherein a first end of the third common protective component is coupled to the first common connection end, wherein a second end of the third common protective component is coupled to the second common connection end, and wherein the third common protective component is configured to ensure that a voltage between a positive electrode and a negative electrode of the first power supply is within a preset voltage range.

17. The power over Ethernet system of claim 11, wherein the PSE further comprises a second Ethernet port and a second power supply control circuit, wherein the second Ethernet port comprises a second power supply pin group and a second non-power supply pin group, wherein the surge protection circuit further comprises a third circuit and a fourth circuit, wherein the third circuit is coupled to the second power supply pin group, the second power supply control circuit, and the first common discharge circuit, wherein the fourth circuit is connected to the second non-power supply pin group and the first common discharge circuit, wherein the third circuit is configured to transmit a third surge to the first common discharge circuit, wherein the PSE is configured to input the third surge from the second power supply pin group to the PSE, wherein the fourth circuit is configured to transmit a fourth surge to the first common discharge circuit, wherein the PSE is further configured to input the fourth surge from the second non-power supply pin group, and wherein the first common discharge circuit is further configured to discharge the third surge and the fourth surge.

18. The power over Ethernet system of claim 11, wherein the PSE further comprises a third Ethernet port, a third power supply control circuit, and a second power supply, wherein the surge protection circuit further comprises a fifth circuit, a sixth circuit, and a second common discharge circuit, wherein the second common discharge circuit is coupled to the second power supply, wherein the third Ethernet port comprises a third power supply pin group and a third non-power supply pin group, wherein the fifth circuit is coupled to the third power supply pin group, the third power supply control circuit, and the second common discharge circuit, wherein the sixth circuit is coupled to the third non-power supply pin group and the second common discharge circuit, wherein the fifth circuit is configured to transmit a fifth surge to the second common discharge circuit, wherein the PSE is configured to input the fifth surge from the third power supply pin group, wherein the sixth circuit is configured to transmit a sixth surge to the second common discharge circuit, wherein the PSE is further configured to input the sixth surge from the third non-power supply pin group to the PSE, and wherein the second common discharge circuit is configured to discharge the fifth surge and the sixth surge.

19. A surge protection method implemented by a surge protection circuit of power sourcing equipment (PSE) and comprising:
  discharging a positive surge to ground to protect a power supply control circuit of the PSE when the positive surge is generated on an Ethernet port of the PSE, wherein the Ethernet port comprises a power supply pin group and a non-power supply pin group, wherein the surge protection circuit comprises a first circuit, a second circuit, and a common discharge circuit, wherein the first circuit is coupled to the power supply pin group, the power supply control circuit and the common discharge circuit, wherein the second circuit is coupled to the non-power supply pin group and the common discharge circuit, and wherein discharging the positive surge to ground comprises:
    inputting the positive surge from the power supply pin group;
    transmitting, by the first circuit, the positive surge input from the power supply pin group to the common discharge circuit; and
    transmitting, by the second circuit, the positive surge to the common discharge circuit; and
  discharging a negative surge to ground to protect the power supply control circuit when the negative surge is generated on the Ethernet port, wherein discharging the negative surge to ground comprises:

inputting the negative surge from the power supply pin group;

transmitting the negative surge input from the power supply pin group to the common discharge circuit; and transmitting the negative surge input from the non-power supply pin group to the common discharge circuit.

20. The power over Ethernet system of claim 14, wherein the third protective component is a diode or a transient voltage suppressor (TVS), and wherein the fourth protective component is a diode or a TVS.

* * * * *